W. H. EYNON.
ELASTIC VEHICLE TIRE.
APPLICATION FILED AUG. 14, 1909.

966,674.

Patented Aug. 9, 1910.

Witnesses:
F. C. Valentine
Celia Curtis

Inventor:
Wm H. Eynon
by Obed B. Billman
his attorney.

UNITED STATES PATENT OFFICE.

WILLIAM H. EYNON, OF CLEVELAND, OHIO.

ELASTIC VEHICLE-TIRE.

966,674.

Specification of Letters Patent. Patented Aug. 9, 1910.

Application filed August 14, 1909. Serial No. 512,826.

*To all whom it may concern:*

Be it known that I, WILLIAM H. EYNON, a citizen of the United States, residing at Cleveland, in the county of Cuyahoga and State of Ohio, have invented certain new and useful Improvements in Elastic Vehicle-Tires, of which the following is a specification.

My invention relates to improvements in elastic vehicle tires, the primary object of the invention being to provide a generally improved elastic tire which will be exceedingly simple in construction, cheap of manufacture, efficient in use, and presenting an improved form of tread designed to provide increased resiliency, and a larger road traction surface adapted to prevent skidding, and the sinking and burying of the tire in sandy roads.

The invention consists primarily in a solid rubber or elastic tire body having symmetrical laterally-extending and projecting tread portions forming an intermediate circumferential groove; said laterally extending tread portions being capable of deflection laterally and toward the rim of the wheel, thereby producing tension strains in the tread and compression strains in the side portions of the tire. The tire body is preferably made up of two elastic rubber ring members as a convenient method of manufacturing and assembling and providing the additional advantage of the ready substitution of a new ring member in case of a serious injury to one of the elastic ring members.

With the above mentioned ends in view, the invention consists in the novel construction, arrangement, and combination of parts, hereinafter described, illustrated in one of its embodiments in the accompanying drawings, and particularly pointed out in the appended claims.

Figure 1:
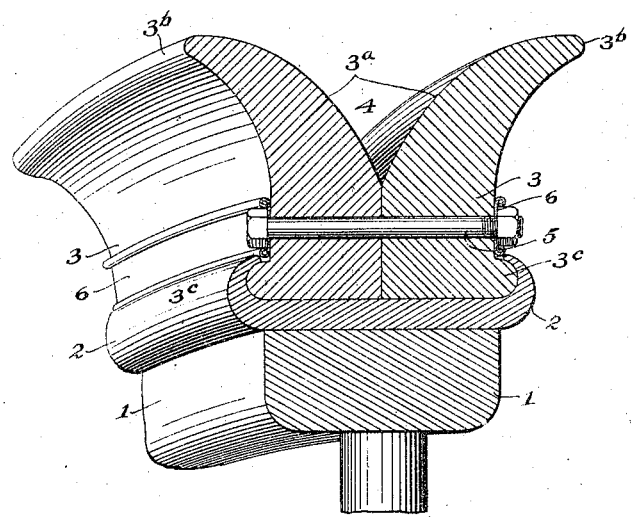
Figure 3:
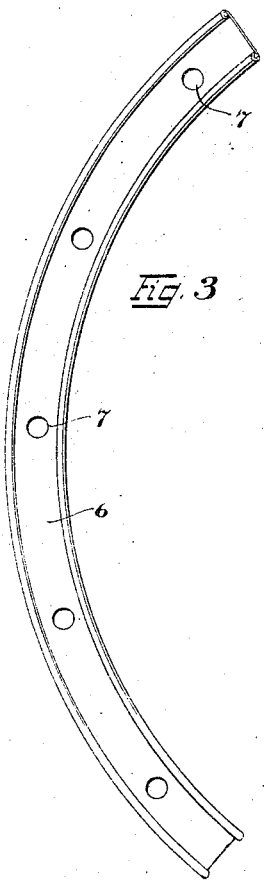
Figure 2:
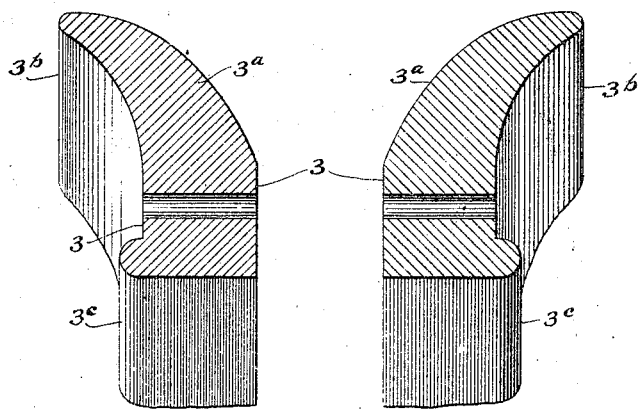

Referring to the drawings, forming a part of this specification, Figure 1 is a perspective view of a section of the improved tire applied to a vehicle wheel of the clencher type. Fig. 2, a similar view of the same, detached and disconnected. Fig. 3, a detail plan view of a section of one of the clamping rings disposed on the sides of the circumferentially-divided tire.

Similar numerals of reference designate like parts throughout all the figures of the drawings.

The improved tire, in the present instance, is shown applied to a vehicle wheel of the clencher type, that is,—having a wheel felly 1, carrying a clencher rim 2. The improved vehicle tire is preferably circumferentially divided by being made up of a pair of elastic solid rubber ring members adapted to provide the requisite resiliency and comprising main body portions 3, adapted to abut against each other, as shown, and terminating in laterally extending tapered tread portions $3^a$, merging into relatively thin tread wings or tips $3^b$, preferably projecting laterally beyond the sides of the tire body and the planes of the sides of the wheel felly and rim portions, as shown. It will be observed that the laterally extending tread portions $3^a$, provide an intermediate circumferential groove 4, and that they are provided with outwardly diverging convex tread surfaces and concave lateral surfaces.

As a means for adapting the improved tire to vehicle wheels of the clencher type, the elastic ring members are provided with heel portions $3^c$, and as a convenient method of maintaining and securing the elastic ring members together and upon and within the clencher rim a plurality of transversely disposed clamping bolts 5, are passed through the elastic ring members at suitable intervals, preferably just outside of the outer periphery of the clencher rim 2, as shown. Clamping rings 6, are preferably disposed on the sides of the ring members of the tire body and outside of the outer periphery of the clencher rim, said clamping rings being provided with bolt openings 7, (see Fig. 3) arranged at suitable intervals and adapted to register with the bolt openings in the elastic ring members.

From the foregoing description, taken in connection with the accompanying drawings, the operation and advantages of my invention will be readily understood.

Having thus described an embodiment of my invention, what I claim and desire to secure by Letters Patent is,—

1. An elastic vehicle tire, comprising a tire body terminating in laterally extending tapered tread portions terminating in relatively thin tread wings projecting beyond the sides of said tire body.

2. An elastic vehicle tire, comprising laterally extending tapered tread portions having their tread and lateral surfaces bounded by convex and concave contour lines, respectively.

3. An elastic vehicle tire, comprising a solid elastic rubber tire having two symmetrical laterally extending and projecting tread portions separated by a circumferential groove said tread portions being provided with diverging convex tread surfaces and concave lateral surfaces.

4. In a tire, the combination with a wheel felly and a clencher rim; of two elastic rubber ring members terminating in convex tread portions separated by a circumferential groove, and transversely disposed clamping bolts passing through and binding said ring members together.

5. In a tire, a wheel felly carrying a clencher rim, elastic ring members mounted in said rim and provided with laterally extending tread portions forming an intermediate circumferential groove, clamping rings disposed on the sides of said ring members and outside of the outer periphery of said clencher rim, and bolts passing through said clamping rings and said elastic ring members.

In testimony whereof I have affixed my signature, in presence of two witnesses.

WILLIAM H. EYNON.

Witnesses:
 HALL BILLMAN,
 O. C. BILLMAN.